United States Patent [19]

Fergason

[11] Patent Number: 4,693,557

[45] Date of Patent: Sep. 15, 1987

[54] LIQUID CRYSTAL MOTION PICTURE PROJECTOR

[75] Inventor: James L. Fergason, Atherton, Calif.

[73] Assignee: Manchester R & D Partnership, Pepper Pike, Ohio

[21] Appl. No.: 892,497

[22] Filed: Aug. 1, 1986

Related U.S. Application Data

[63] Continuation-in-part of Ser. No. 585,884, Mar. 2, 1984, Pat. No. 4,603,945, and Ser. No. 608,135, May 8, 1984, Pat. No. 4,613,207.

[51] Int. Cl.⁴ .............................................. G02F 1/13
[52] U.S. Cl. ............................... 350/331 R; 350/334; 350/336; 350/350 S
[58] Field of Search ............... 350/331 R, 334, 336, 350/345

[56] References Cited

U.S. PATENT DOCUMENTS

| | | |
|---|---|---|
| 3,600,060 | 8/1971 | Churchill et al. . |
| 3,622,226 | 11/1970 | Matthies . |
| 3,703,331 | 11/1972 | Goldmacher et al. . |
| 3,844,650 | 10/1974 | Nicholson et al. . |
| 4,012,122 | 3/1977 | McVeigh . |
| 4,105,313 | 8/1978 | Altman ........................ 350/331 R X |
| 4,110,794 | 8/1978 | Lester et al. . |
| 4,194,833 | 3/1980 | Lester et al. . |
| 4,239,345 | 12/1980 | Berreman et al. . |
| 4,279,152 | 7/1981 | Crossland . |
| 4,294,524 | 10/1981 | Stolov . |
| 4,297,022 | 10/1981 | Lester . |
| 4,334,734 | 6/1982 | Hareng et al. . |
| 4,386,836 | 6/1983 | Aoki et al. ................. 350/331 R X |
| 4,435,047 | 3/1984 | Fergason .................... 350/350 R X |
| 4,603,945 | 8/1986 | Fergason ........................ 350/336 X |
| 4,613,207 | 9/1986 | Fergason .................... 350/331 R X |

FOREIGN PATENT DOCUMENTS 2139537  1/1973  France .

OTHER PUBLICATIONS

Clark, W. D., "Copier Printhead", *IBM Technical Disclosure Bulletin*, vol. 19, No. 7 (Dec. 1976), p. 2447.

*Primary Examiner*—John K. Corbin
*Assistant Examiner*—Richard F. Gallivan
*Attorney, Agent, or Firm*—Renner, Otto, Boisselle & Lyon

[57] ABSTRACT

A liquid crystal moving picture projector includes a liquid crystal imager or display device and projection optics for projecting images sequentially created by the imager. The imager, sometimes referred to as a liquid crystal display, includes a continuous strip of liquid crystal material capable of temporarily storing charge to create characteristics of an image on a frame by frame basis capable of being projected and a dynamic electrode system selectively to apply charge to the liquid crystal material to create the sequential images. The projection optics includes light source, mask, shutter and lens systems capable of projecting the sequential images created by the imager.

29 Claims, 17 Drawing Figures

LIQUID CRYSTAL MOTION PICTURE PROJECTOR

This application is a continuation-in-part of applicant's copending U.S. patent applications Ser. No. 585,884, filed Mar. 2, 1984, now U.S. Pat. No. 4,603,945, and Ser. No. 608,135, filed May 8, 1984, now U.S. Pat. No. 4,613,207. The entire disclosures of such patent applications hereby are incorporated by reference.

CROSS REFERENCE TO RELATED APPLICATIONS

Reference is made to applicant's commonly assigned, U.S. Pat. No. 4,435,047, issued Mar. 6, 1984, for "Encapsulated Liquid Crystal and Method"; and copending U.S. patent applications Ser. No. 477,138, U.S. Pat. No. 4,606,611, for "Enhanced Scattering in Voltage Sensitive Encapsulated Liquid Crystal" and Ser. No. 477,242, U.S. Pat. No. 4,616,903 for "Encapsulated Liquid Crystal and Method", both filed Mar. 21, 1983; Ser. No. 480,461, U.S. Pat. No. 4,662,720, "Colored Encapsulated Liquid Crystal Devices Using Imbibition of Colored Dyes and Scanned Multicolor Displays" and Ser. No. 480,466, U.S. Pat. No. 4,596,445, for "Colored Encapsulated Liquid Crystal Apparatus Using Enhanced Scattering", both filed Mar. 30, 1983; and Ser. No. 585,883 for "Encapsulated Liquid Crystal Material, Apparatus and Method", filed Mar. 2, 1984; the entire disclosures of such patents and applications hereby are incorporated by reference.

TECHNICAL FIELD

The present invention relates generally to projectors and, more particularly, to a liquid crystal moving picture projector and method. In one embodiment of the invention light incident on a liquid crystal display-type device or imager selectively is scattered or transmitted by respective portions of the liquid display, and a projection mechanism projects an image formed by either such scattered light or such transmitted light. (As used herein in connection with the invention the terms liquid crystal display and liquid crystal imager are intended to be synonymous and equivalent).

BACKGROUND

A conventional optical moving picture projector may include a light source, an input image device holder, such as a film guide, sprockets, shutter, etc., or by which a film, and particularly the frames thereof, may be placed for illumination by light from the light source, and a lens system for projecting an image of the illuminated frame. Typically the film would have optically transparent portions, optically absorbent, e.g. black, and colored portions. When projected onto a screen, such black portions appear black due to absorption of light by the light absorbing, e.g. black emulsion, material, and the optically transmissive portions would appear relatively bright on the screen. Common exemplary projectors are of 8, 16, and 32 millimeter sizes, depending on the size of the film used.

One problem with conventional projectors is the large amount of heat that is absorbed by the light absorbing portions of the film, which could cause destruction or damage to the latter; to minimize such heat build-up it often is necessary to use one or more infrared or heat absorbing filters optically upstream of the film. The heat dissipated in the heat filters and at the optical source or cabinet containing the same requires elimination, for example by a blower or other means. The blower may produce undesirable noise and/or vibration and uses energy that would not have to be consumed if the heat did not require such elimination. A further disadvantage of conventional projectors is the diffraction of light at the interface between light absorbing material, such as a black emulsion, and transparent material of the film; such diffraction can reduce the contrast and quality of the projected image seen on a screen. Furthermore, in conventional film projectors, contrast would be reduced since images are formed in part, at least, by the blockage of light, and such blockage is a function of absorption, which can vary, depending on the quality of opaqueness of the blocking material. Other disadvantages of conventional motion picture projectors is the size and number of reels of film needed to project an entire motion picture, story, etc., due to the relatively fixed nature of the respective images and scenes in the film.

Liquid crystal material currently is used in a wide variety of devices, including, for example, optical devices such as visual displays. A property of liquid crystals enabling use in visual displays is the ability to scatter and/or to absorb light when the liquid crystals are in a random alignment and the ability to transmit light when the liquid crystals are in an ordered alignment.

Frequently a visual display using liquid crystals displays dark characters on a gray or relatively light background. In various circumstances it would be desirable, though, using liquid crystal material to be able to display with facility relatively bright characters or other information, etc. on a relatively dark background. It would be desirable as well to improve the effective contrast between the character displayed and the background of the display itself.

Examples of electrically responsive liquid crystal material and use thereof are found in the above patents and applications.

Currently there are three categories of liquid crystal materials, namely cholesteric, nematic and smectic. The present invention preferably uses nematic liquid crystal material or a combination of nematic and some cholesteric type. More specifically, the liquid crystal material preferably is operationally nematic, i.e. it acts as nematic material and not as the other types. Operationally nematic means that in the absence of external fields structural distortion of the liquid crystal is dominated by the orientation of the liquid crystal at its boundaries, e.g. with a surface, such as the surface of a capsule-like volume, rather than bulk effects, such as very strong twists as in cholesteric material, or layering as in smectic material. Thus, for example, chiral ingredients which induce a tendency to twist but cannot overcome the effects of boundary alignment still would be operationally nematic. Such material should have a positive dielectric anisotropy. Although various characteristics of the various liquid crystal materials are described in the prior art, one known characteristic is that of reversibility. Particularly, nematic liquid crystal material is known to be reversible (and that characteristic is desirable in the present invention), but cholesteric material ordinarily is not reversible. Smectic liquid crystal may be used in the invention, too.

It is also known to add pleochroic dyes to the liquid crystal material. One advantage to using pleochroic dye with the liquid crystal material is the eliminating of a need for a polarizer. However, in the nematic form a pleochroic device has relatively low contrast. In the past cholesteric material could be added to the nematic material together with the dye to improve contrast ratio. See for example the White et al article in *Journal of Applied Physics*, Vol. 45, No. 11, November 1974, at pages 4718-4723. However, although nematic material is reversible, depending on whether or not an electric field is applied across the same, cholesteric material ordinarily would not tend to its original zero field form when the electric field would be removed and this characteristic may detrimentally affect the quality of a display that uses nematic and cholesteric liquid crystal and pleochroic dye. For example, a disadvantage to use of pleochroic dye in solution with liquid crystal material is that the absorption of the dye is not zero in the field-on condition; rather, absorption in the field-on condition follows an ordering parameter, which relates to or is a function of the relative alignment of the dyes.

Usually liquid crystal material is anisotropic both optically (birefringence) and, for example in the case of nematic material, electrically. The optical anisotropy is manifest by the scattering of light when the liquid crystal material is in random alignment, and the transmission of light through the liquid crystal material when it is in ordered alignment. The electrical anisotropy may be a relationship between the dielectric constant or dielectric coefficient with respect to the alignment of the liquid crystal material.

In the past, devices using liquid crystals, such as visual display devices, have been relatively small. Use of encapsulated liquid crystals disclosed in applicant's above mentioned patents and co-pending applications has enabled the satisfactory use of liquid crystals in relatively large size displays, such as billboards, etc., as is disclosed in such applications; and another large (or small) scale use may be as an optical shutter to control passage of light from one area into another, say at a window or window-like area of a building. The present invention relates to improvements in such encapsulated liquid crystals using the same in a film on which plural frames can be created to represent an image or characteristics of an image and to the utilization of the light scattering and transmitting characteristic of the liquid crystal material for projection purposes.

As used herein with respect to the present invention, encapsulated liquid crystal material means liquid crystal material in a containment medium with a surface for distorting the natural structure of the liquid crystal in the absence of a prescribed input to cause scattering of incident light. Thus, a quantity of liquid crystal material is contained in a volume or volumetric space in the containment medium. The respective volumetric spaces may be substantially closed, may be capsule-like, may be like cells in stable emulsion or matrix, and/or may be interconnected with other volumetric spaces, and so on. According to a preferred embodiment, the encapsulated liquid crystal material is represented by a plurality of volumes of liquid crystal in a containment medium formed as an emulsion of the liquid crystal material and the containment medium. Such emulsion should be a stable one. Various methods for making and using encapsulated liquid crystal material and apparatus associated therewith are disclosed below and in applicant's patents and co-pending patent applications, which are incorporated by reference.

Liquid crystal projectors and projection optics are disclosed in applicant's above-mentioned '135 application. Liquid crystal imagers which create an image or characteristics of an image using charge storage techniques are disclosed in applicant's above-mentioned '884 application. The present invention relates to a liquid crystal motion or moving picture projector utilizing the projectors and projection optics of the '135 application and the charge storage imager techniques to create a plurality of images or characteristics of images capable of sequential projection by the projector. As used herein, the terms liquid crystal display and liquid crystal imager are intended to be equivalent and interchangeable. The liquid crystal display or imager creates the image or the characteristics of the image intended to be projected by the projector or projection optics.

BRIEF SUMMARY OF INVENTION

Briefly, the motion picture projector of the invention includes a projector or projection optics for projecting an image, a liquid crystal film having a charge storage capability and on which the image or characteristics of the image is created for projection, and an input device for selectively applying charge to the liquid crystal film to create a desired image. The input device selectively applies the charge, e.g. as a pattern of charge, to the liquid crystal film to create plural image frames that can be moved sequentially into the projection optics which in turn projects the frames sequentially. To create a given image frame, the charge is applied to selected areas of the liquid crystal film to create electric field that determines which areas of the liquid crystal film will scatter light and which areas will transmit light without scattering. After a given frame has been projected, it is moved out of the projection optics and the next frame is moved into the projection optics for projection. Moreover, preferably after a frame has been projected and moved out of the projection optics and prior to the next pattern of charge being applied thereto, the remnants of the original charge is removed or is discharged.

The projection optics may include an aperture intended to block scattered light and to transmit light which is essentially transmitted through the liquid crystal display for focusing and/or projection onto a screen or other surface on which the projected image is formed. Alternatively, the projection optics may include a mask which blocks the transmitted light and a lens which gathers or collects the scattered light for projection onto the screen as the viewable projected image.

The "film" used in the invention preferably is an endless strip or loop of film formed of a flexible transparent support, an electrode, and encapsulated liquid crystal having a temporary charge storage capability. Such film, then, in a sense is a liquid crystal display or imager that has formed therein plural image frames capable of projection by the projection optics.

The liquid crystal display taking the place of the transparency or conventional film, in the projector of the invention, preferably has the ability to effect scattering, preferably generally isotropic scattering, of light or to transmit light. The display is formed of plural volumes of liquid crystal material in a containment medium. Those volumes may be fluidically isolated or interconnected or both. Preferably the liquid crystal material is nearly completely isotropically scattering when in distorted or curvilinear alignment; at least such liquid crystal material preferably effects as much isotropic scattering as is possible. Isotropic scattering means that when a beam of light enters the liquid crystal material there is virtually no way to predict the exit angle of scattered light. Alternatively, the distorted liquid crystal material may effect generally forward, but generally random or uncollimated or unfocused forward scattering of light. On the other hand, in the presence of the prescribed input, such as an electric field, the liquid crystal structure tends to align with respect to the field and effectively becomes optically transparent.

The liquid crystal may include pleochroic dye if absorption characteristics are desired. The liquid crystal and/or the containment or support medium may include non-pleochroic dye for coloring light transmitted therethrough. A liquid crystal color filter having only one color or multiple colors may be used to color light projected by the projector.

As it is used herein with respect to the invention, the terms distorted alignment, random alignment, curvilinear alignment and field-off condition mean essentially the same thing; namely, that the directional orientation of the liquid crystal molecules or structure is distorted to an effectively curved configuration. Such distortion is effected, for example, by the wall of respective volumes or capsules containing the liquid crystal.

On the other hand, as it is used herein with respect to the invention, parallel aligned, ordered alignment, and field-on condition means that the liquid crystal material in a volume, capsule, etc., is generally aligned with respect to an externally applied electric field.

The present invention provides the ability to produce relatively rapidly an image of alphanumeric, graphical, pictorial, etc., data, information, images, etc., from information received from a remote source and/or from a local source. Importantly, the invention permits the formation of an image in real time or substantially in real time, e.g. essentially immediately on receipt of the incoming data or information, and that image is stored for a period that is adequate to permit projecting of the image.

According to another aspect of the invention, an imager includes a liquid crystal device having an alterable optical function for affecting the transmission, scattering or absorption of light incident thereon, a support for supporting the liquid crystal device in sheet-like or strip-like (e.g. an endless loop or strip) lay out, the liquid crystal device being responsive to a prescribed input to alter such optical function to form characteristics of an image, an input device for selectively applying the prescribed input to respective portions of the liquid crystal device, and the liquid crystal device having a memory function for temporarily storing the image characteristics after termination of a direct input thereto by the input device.

According to a further aspect of the invention an apparatus for mechanically depositing electric charge to a surface of a sheet-like liquid crystal material having opposite surfaces, includes a dynamic electrode having plural electrode means respectively electrically isolated from each other for applying electrical surface charge with respect to selected surface areas of such sheet-like liquid crystal material, electrical means for applying an electrical voltage to respective electrode means, and movement means for effecting relative movement of said dynamic electrode and such sheet-like liquid crystal material.

In one embodiment of the invention the liquid crystal device of the imager includes encapsulated liquid crystal material formed as and/or supported on a sheet or strip. Such encapsulated liquid crystal material is capable of absorbing, scattering, and/or transmitting light in response to a prescribed input, such as an electric field. The encapsulated liquid crystal material has an electrical capacitance characteristic and, therefore, is capable of temporarily storing an electrical charge applied thereto. According to the invention, then, electrical charge selectively is applied to designated areas of the encapsulated liquid crystal material for temporary storage there. Characteristics of an image, then, are created by the encapsulated liquid crystal material as a function of the respective areas thereof that are storing an electrical charge (and also as a function of the magnitude of such stored electrical charge and the electric field produced thereby) and those areas of the liquid crystal material where there is no electrical charge stored. A scanning or addressing mechanism according to the invention facilitates the scanning, traversing or relative movement of the encapsulated liquid crystal material selectively by a dynamic electrode to apply such electrical charge thereto. The image characteristics formed by the encapsulated liquid crystal material may be projected.

Preferably according to the invention encapsulated liquid crystal technology is used in the imager. Preferably the encapsulated liquid crystal material is of the operationally nematic type, which has the advantageous characteristics of prompt response to the application or removal of an electric field, reversability, and the ability to scatter, to absorb, and/or to transmit light controllably in response to the application or removal of such prescribed input.

Some terms used herein generally are defined as follows: "liquid crystal material" broadly refers to any type of liquid crystal material that will work in the context of the present invention, but preferably refers to operationally nematic liquid crystal material. Such operationally nematic liquid crystal material may include pleochroic dyes, non-pleochroic dyes, chiral compounds, or other co-ingredients. A capsule refers to a containment device or medium that contains or confines a quantity of liquid crystal material, and "encapsulating medium" or "material" is that medium or material of which such capsules are formed. The capsules may be closed, e.g. as a closed sphere, having an interior volume containing liquid crystal material or may be partially closed so as to define a specified volume for containing the liquid crystal material while one or more passageways actually interconnect the interior volumes of two or more such capsules. An "encapsulated liquid crystal" or "encapsulated liquid crystal material" means a quantity of liquid crystal material confined or contained in the capsules of either or both types formed by and/or in the encapsulating medium, for example in a solid medium as individual capsules or dried stable emulsions.

Capsules according to this invention generally have an approximately spherical configuration (though this is not, per se, a requisite of the invention) having a diameter from about 0.3 to 100 microns, preferably 0.1 to 30 microns, especially 0.5 to 15 microns, for example most preferred 1 to 5 microns. In the context of this invention, encapsulating and like terms refer not only to the formation of such articles as are generally referred to as capsules, but also to the formation of stable emulsions or dispersions of the liquid crystal material in an agent (an encapsulating medium) which results in the formation of stable, preferably approximately uniformly sized, particles in a uniform surrounding medium. Techniques for encapsulation, generally referred to as microencapsulation because of the capsule size, as well known in the art (see, e.g., "microcapsule Processing and Technology" by Asaji Kondo, published by Marcel Dekker, Inc.) and it will be possible for one skilled in the art, having regard to the disclosure herein, to determine suitable encapsulating agents and methods for liquid crystal materials.

To help assure that adequate electric field is applied across the liquid crystal material in the capsule, and not just across or through the encapsulating medium, and, in fact, with a minimum voltage drop across the wall thickness of the respective capsules, the encapsulating material preferably has a dielectric constant no less than the lower dielectric constant of the liquid crystal material, on the one hand, and a relatively large impedance, on the other hand. Ideally, the dielectric constant of the encapsulating medium should be close to the higher dielectric constant of the liquid crystal.

Contrast of a liquid crystal device employing encapsulated liquid crystals may be improved by selecting an encapsulating medium that has an index of refraction that is matched to the ordinary index of refraction of the liquid crystal material (i.e. the index of refraction parallel to the optical axis of the crystal). See, e.g. "Optics" by Born & Wolf, or "Crystals and the Polarizing Microscope" by Hartshorne & Stewart. The encapsulating medium may be used not only to encapsulate liquid crystal material but also to adhere the capsules to a substrate for support thereon. Alternatively, a further binding medium may be used to hold the liquid crystal capsules relative to a substrate. In the latter case, though, preferably the additional binding medium has an index of refraction which is matched to that of the encapsulating medium for maintaining the improved contrast characteristic describe above. Because the index of refraction of a material is generally strain-dependent, and strain may be induced in, e.g. the encapsulating medium, it may be necessary to consider this effect in matching the indices of refraction of the liquid crystal, encapsulating medium, and binding medium, if present. Further, if irridescence is to be avoided, it may be desirable to match the indices of refraction over a range of wavelengths to the extent possible, rather than at just one wavelength.

A feature of the spherical or otherwise curvilinear surfaced capsules which generally confine the liquid crystal material therein in accordance with the present invention is that the liquid crystal material tends to be forced or distorted to a specific form, being folded back on itself in a sense as it follows and/or generally aligns parallel or normal to the capsule wall, so that the resulting optical characteristic of a given capsule containing liquid crystal material is such that substantially all light delivered thereto will be affected, for example, scattered (when no pleochroic dye is present) or absorbed (when pleochroic dye is present), when no electric field is applied, regardless of the polarization direction of the incident light. However, in response to application of an electric field to the encapsulated liquid crystal material, the liquid crystal structure aligns with the field and scattering or absorption of light is reduced.

Preferred encapsulated liquid crystal material useful in the present invention is disclosed in applicant's above patents and co-pending U.S. patent applications.

Advantageous features inuring to the invention include improved contrast, coolness of operation, and versatility of the display and image. Contrast is improved over prior art photographic and transparency film displays, for example, because light is not absorbed by an emulsion or other absorbing material on the transparency; rather, in the invention light is scattered and blocked, not being permitted to pass through the aperture or is focused and blocked by a mask. Since light intentionally preferably is not absorbed by the liquid crystal display of the invention, heat energy does not have to be dissipated by the light absorbing material; therefore, the overall operation of the projector is cooler, a separate blower and/or heat filters could be eliminated, the potential of heat damage to the display is minimized, etc. Versatility of the projector according to the invention resides, for example, in the ability conveniently to change the phase of the image, for example, conveniently being able to project bright characters on a dark background or vice versa as well as the ability conveniently to change the image by changing the electrical input to the liquid crystal display and, therefore, controlling which portions of the display scatter and which portions transmit light. Also, color filters conveniently can be added at the light output of the projector.

These and other embodiments of the invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

Figure 1:
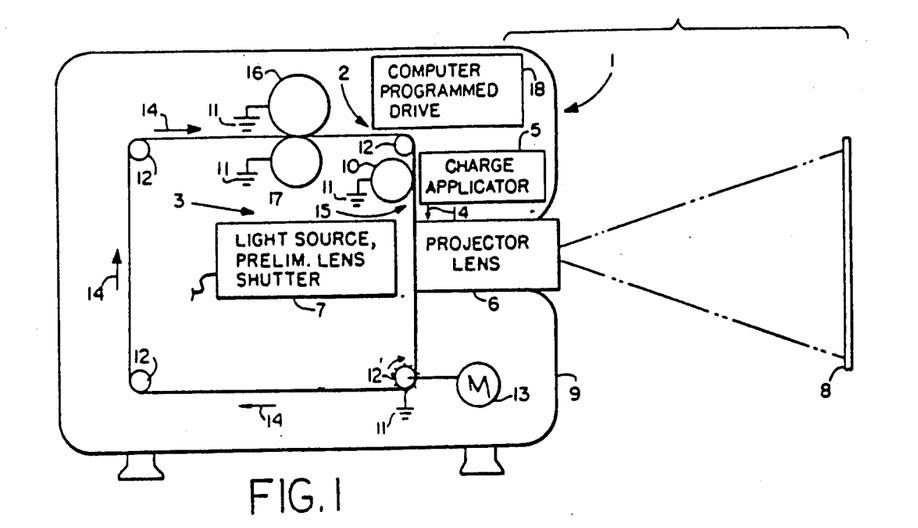
FIG. 1 is a schematic representation of a liquid crystal moving picture projector in accordance with the present invention.

Referring, now, in detail to the drawings, wherein like reference numerals designate like parts in the several figures, and initially to FIG. 1, a liquid crystal moving picture projector in accordance with the invention is designated 1. The projector 1 includes a liquid crystal imager or display device 2 and projection optics 3 for projecting images sequentially created by the imager 2. The imager 2, sometimes referred to as a liquid crystal display, includes a continuous strip 4 of liquid crystal material capable of temporarily storing charge to create characteristics of an image on a frame by frame basis that can be projected and a charge applicator 5 selectively to apply charge to the liquid crystal material to create the sequential images. The projection optics 3 includes a projection lens 6 and various other optics, such as light source, mask, shutter and lens systems generally designated 7 capable of projecting the sequential images created by the imager 2 onto a screen 8. A housing or case 9 may be provided to contain the parts 2-7 of the projector. If desired, the housing 9 may be light tight to prevent undesirable escape of light generated by the projection optics 3.

Details of the projection optics 3 will be described further below, for example with reference to FIGS. 9-15. Suffice it to say here that it is the function of the imager 2 to create plural frames of images or representations of images by liquid crystal that scatters light or transmits light without scattering it; and it is those images that are projected. Moreover, the imager 2 is capable of continuously supplying sequential images to the projection optics without the need for large reels of film or the like. Those sequential images are created at sequential locations on the continuous strip 4, are projected, and subsequently are replaced. After projection of an image and before replacement by another image, an image may be erased or allowed to dissipate.

The continuous strip 4 is formed of liquid crystal material that has a capacitance characteristic which enables charge to be stored on the surface 4S thereof. The surface charge together with an electrode, which is formed as part of the strip 4 and preferably is at a reference potential, such as ground, creates an electric field at a selected area of the strip between such charge and electrode. Details of the imager 2, including of the strip 4 and of the charge applicator 5, will be described in further detail below.

The charge applicator 5 applies such charge preferably just prior to the projection optics 3 to minimize dissipation between the time the charge is applied and the time the image is projected. A metal roller 10 rolls against the strip 4 or at least part of it to make contact with the mentioned electrode to maintain the same at ground reference potential, as is seen at the connection 11 to a relative ground, for example. Such electrode preferably is continuous over the entire length and width of the strip and, therefore, is maintained at ground by such connection. Means other than the roller 10 may be used for such ground or other reference potential connection.

Additionally, the imager 2 includes plural rollers 12 along which the strip is moved during cyclical movement along a continuous path, as is seen in FIG. 1. A motor 13, such as a synchronous motor, may be used to drive one of the rollers 12', e.g. a sprocket, to drive the continuous strip along its path designated by directional arrows 14.

The charge applicator 5 is operative at a charge applying station 15 upstream of the projection optics 3. Therefore, promptly after the charge applicator 5 applies a charge to the strip to create an image in a given frame, such frame passes to alignment with the projection optics and the image therein is projected. There is no restriction of where on the length of the strip 4 an image forming a given frame is formed; however, there should be synchronization of the charge applicator 5, the movement of the strip 4 and the operation of the projection optics 3, such as the shutter, etc. thereof, to assure projection of a quality image.

Discharge rollers 16, 17 discharge any remaining charge on strip 4 prior to reapplication of charge by the charge applicator 5. Such discharge rollers 16, 17 preferably are electrically conductive material that couple to the surface 4S and to the strip electrode 27 (not shown in FIG. 1) to assure discharging. The discharge rollers 16, 17 preferably are connected to ground 11 or are otherwise connected to achieve the discharge function. The discharge rollers 16, 17 may have smooth cylindrical surfaces for good engagement with the surface 4S and the electrode 27; may be flat or stepped wiping surfaces either stationary or movable, e.g. a stepped surface would wipe an exposed edge of electrode 27; may be a series of wire-like projections that wipe across the strip 4; etc., to achieve the desired discharging function.

In the event that the charge on a given area, e.g. that forming a given frame, of the strip generally adequately dissipates before that area is re-presented to the charge applicator 5 for appropriate recharging, or if separate discharging is unnecessary prior to recharging by the charge applicator 5, the discharge rollers 16, 17 may be unneeded. Atlternatively or additionally, the idler rollers 12 and/or drive sprocket 12' may be electrically conductive and connected to ground to effect discharging function. Advantageously, the sprocket, for example, has teeth that pass through the strip and can be electrically conductive to form a good connection with the electrode 27 coupling the same to ground.

The charge applicator 5 preferably is in the form of a dynamic electrode, as is described in detail below with reference to FIGS. 6-9. Moreover, associated with the charge applicator 5, and, if desired, considered a part of the imager 2 along with the strip 4, charge applicator 5 and various rollers and associated parts, is a computer/-programmed drive 18. The drive 18 has as its function the control of the charge applicator 5 o determine at what areas of the strip charge is to be applied and at what areas charge is not to be applied. Moreover, the drive 18 may include means to determine the magnitude of such charge so that in a sense a gray scale function can be accomplished in the image projected onto the screen 8. Thus, in the computer/programmed drive 18 may be a memory, such as RAM, ROM, disk, tape, or other volatile or non-volatile memory, capable of storing information indicating when and where charge is to be applied or not to the strip to create a series of sequential image frames that can be projected to create a moving picture, for example. Alternatively, the computer/-programmed drive 18 may include circuitry for detecting and/or decoding incoming information from another source, such as a local or remote computer, e.g. via a modem connection, to effect control of the charge applicator 5 to create the desired images on the strip 4.

In view of the foregoing brief description and the following detailed description, it will be appreciated, then, that the information to create sequential image frames on the strip 4 for projection by the projection optics 3 can be stored in a solid state or other electronic memory locally, i.e. at or in proximity to the projector 1, or may be received from a distant source.

Figure 2:
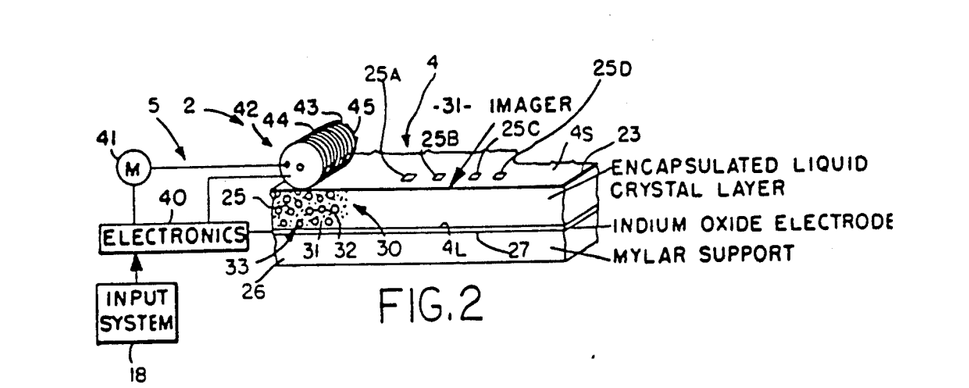
FIG. 2 is a fragmentary schematic side elevation/perspective view of a liquid crystal imager in accordance with the preferred embodiment and best mode of the present invention.

Turning preliminarily to FIG. 2, the imager 2 preferably is capable of forming an image representing the information received from the drive 18 and applicator 5 essentially in real time, i.e. essentially at the same time that the information is received from the drive 18 without requiring any slow-down of the rate at which the input information is received. Additionally, the imager 2 is capable of storing or maintaining such image for a period adequate to permit projecting thereof by the projection optics 3 e.g. as a function of surface charge storage on the surface 4S of the strip 4. Furthermore, the liquid crystal strip 4, indeed the entire projector 1, preferably is capable of substantially continuous use to form one image after another and to protect each of the images to create a moving or like image on the screen 8. The limitations on speed of operation of the liquid crystal projector 1 may be, for example, the rate at which information can be received at the applicator 5, the rate at which such input information can be converted to an image, which may be effected essentially simultaneously upon receipt of the information, and the operational speed of the strip 4 and projection optics 3.

The imager 2 converts input information received from the drive 18 and applicator 5 to an image on the strip 4 capable of being projected. The strip 4 includes an encapsulated liquid crystal layer 25 mounted for support on a sheet-like support 26, for example of Mylar or similar relatively strong optically transparent material. An optically transparent electrode 27 covers the surface 28 of the support 26 and separates the latter from the liquid crystal layer 25. The charge applicator 5, in response to the information received from the drive 18, applies a prescribed input, in the preferred embodiment a charge that produces an electric field, to selected areas on the surface 4S of the encapsulated liquid crystal layer 25 thereby to form an image represented by the information received.

The encapsulated liquid crystal layer 25 is encapsulated liquid crystal material 30 formed of a containment medium or encapsulating medium 31 and liquid crystal material 32. Examplary materials for the containment medium 31 include, for example, polymers, for example polyvinyl alcohol (PVA), gelatin, latex and various other materials, for example which are mentioned in the aforementioned patent applications. Epoxy is another example of a containment medium. The liquid crystal material 32 preferably is nematic or operationally nematic and, for example, may be of one or more of the liquid crystal materials disclosed in the aforementioned patent applications. The containment medium 31 and liquid crystal material 32 cooperate to form a plurality of capsules, volumes, containment areas, or the like generally represented at 33, each of which may be closed or partly closed, in the latter case two or more of the so-called capsules may be fluidically coupled by interconnecting passageways like in a matrix formed of the medium and liquid crystal. The interior wall of a capsule generally tends to distort the structure of the liquid crystal material therein causing the same to assume a distorted or generally curvilinearly aligned structure, as opposed to the usual straight line parallel structure that nematic liquid crystal material tends to assume in the absence of a prescribed input, hereinafter referred to as an electric field, which is the preferred prescribed input in accordance with the invention. Such distorted structure typically would be aligned generally either parallel or normal to the capsule wall. However, in the presence of such electric field, the structure of the liquid crystal material 32 in the capsules 33 tends to align with respect to the field. On removal of the field again, though, the capsule wall effects the aforementioned distorted alignment. A plurality of capsules 33 preferably several capsules thick preferably make up the encapsulated liquid crystal layer 25 generally as is represented in the illustration of FIG. 2. The overall thickness of such layer 25 may be, for example, from about 0.3 mil to about 10 mils (about 0.5 mil being preferred), and the approximate diameter of each capsule may be, for example, from about 0.3 micron to about 100 microns, or one of the ranges above, with about 1 micron to about 5 microns being preferred. The capsules may be arranged in discrete layers or, more preferably, in a generally random, but nevertheless relatively close packed relation generally as is shown in the illustration of FIG. 2.

The shape of the interior surface of the volumes containing the liquid crystal material also should tend to distort the liquid crystal material when in a field-off or random alignment condition. A particular advantage to the preferred spherical configuration of the volumes is the distortion it effects on the liquid crystal therein when in a field-off condition. This distortion is due, at least in part, to the relative sizes of the volumes and the pitch of the liquid crystal; they preferably are about the same or at least about the same order of magnitude. Moreover, nematic liquid crystal material has fluid-like properties that facilitate the conformance or the distortion thereof to the shape of the capsule or volume wall surfaces in the absence of an electric field. On the other hand, in the presence of an electric field such nematic material will relatively easily change to ordered alignment with respect to such field.

The liquid crystal material 32 is optically anisotropic having ordinary and extraordinary indices of refraction; and the containment medium 31 preferably is substantially optically transparent, for example from the ultraviolet to the far infrared wavelength range. The index of refraction of the containment medium 31 and the ordinary index of refraction of the liquid crystal material 32, i.e. the index of refraction parallel to the optical axis of the liquid crystal (and occurring in the presence of an electric field which aligns the liquid crystal, as aforesaid) are optically matched so that in the presence of an electric field light may be transmitted substantially directly through the layer 25 without or at least with only a minimum of refraction at interfaces between liquid crystal material 32 and containment medium 31. However, the extraordinary index of refraction of the liquid crystal material should be different from the index of refraction of the containment medium thereby to increase the refracting and scattering of light in the encapsulated liquid crystal layer 5 in the absence of an electric field.

The electrical characteristics of the containment medium 31 and the liquid crystal material 32 are such that preferably in response to the application of a voltage thereto the major electric field produced thereby will be across the liquid crystal material and minimum voltage drop will occur across the encapsulating medium itself. Accordingly, the containment medium 31 should have a dielectric constant no less than the lower dielectric constant of the liquid crystal material, which is electrically anisotropic, and a relatively large impedance. Ideally, the dielectric constant of the encapsulating medium 31 should be close to the higher dielectric constant of the liquid crystal material, too.

Viewed on a so-called macroscopic or collective level, the encapsulated liquid crystal layer 25 essentially is a dielectric material having an average dielectric constant value, which may vary slightly during use, e.g. according to application or removal of an electric field to the liquid crystal material 32, and which also may be a function of the overall materials of which the layer 25 is composed. Accordingly, the encapsulated liquid crystal layer 25 has the ability to function as a capacitor storing an electric charge, namely a voltage, which may be applied thereacross. As is described further below, then, it is the function of the charge applicator 5 to apply surface charge to selected areas of the layer 25 for temporary storage and to create the image characteristics in the liquid crystal material for copying.

Liquid crystal material of a type other than nematic or combinations of various types of liquid crystal material and/or other additives may be used with or substituted for the preferred nematic liquid crystal material as long as the encapsulated liquid crystal is operationally nematic. However, cholesteric and smectic liquid crystal material generally are bulk drive. It is more difficult to break up the bulk structure thereof for conformance to capsule wall shape and energy considerations in the capsule.

Figure 3:
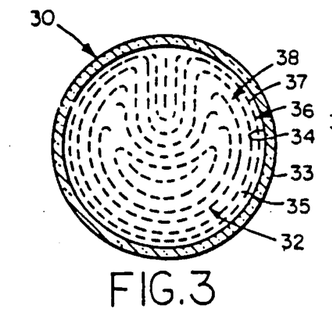
FIGS. 3 and 4 are enlarged schematic illustrations of a liquid crystal capsule in accordance with the present invention respectively under a no-field condition and under an applied electric field condition.
Figure 4:
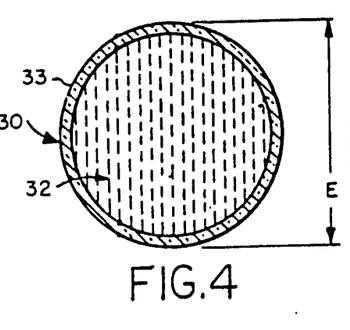

Turning to FIGS. 3 and 4, a schematic representation of a single capsule 33 containing liquid crystal 30 is shown, respectively, in the field-off and field-on conditions. The capsules 33 are spherical and have a generally smooth curved interior wall surface 34 defining the boundary for the interior volume or volumetric space 35 thereof. The actual dimensional parameters of the wall surface 34 and of the overall capsule 33 are related to the quantity of liquid crystal 32 contained therein and possibly to other characteristics of the individual liquid crystal material therein. Additionally, the capsule 33 applies a force to the liquid crystals 32 tending to pressurize or at least to maintain substantially constant the pressure within the volume 35. As a result of the foregoing, and due to the surface wetting nature of the liquid crystal, the liquid crystals which ordinarily in free form would tend to be parallel, although perhaps randomly distributed, are distorted to curve in a direction that generally is parallel to a relatively proximate portion of the interior wall surface 34. Due to such distortion the liquid crystals store elastic energy. For simplicity of illustration, a layer 36 of liquid crystal molecules whose directional orientation is represented by respective dashed lines 37 is shown in closest proximity to the interior wall surface 34. The directional orientation of the liquid crystal molecules 37, more accurately the liquid crystal structure, is distorted to curve in the direction that is parallel to a proximate area of the wall surface 34. The directional pattern of the liquid crystal molecules away from the boundary layer 37 within the capsule is represented by 38. The liquid crystal molecules are directionally represented in layers, but it will be appreciated that the molecules themselves are not confined to such layers. Thus, the organization in an individual capsule is predetermined by the organization of the structure 37 at the wall and is fixed unless acted on by outside forces, e.g. an electric field. On removal of the electric field the directional orientation would revert back to the original one, such as that shown in FIG. 3.

Nematic type material usually assumes a parallel configuration and usually is optical polarization direction sensitive. However, since the material 32 in the encapsulated liquid crystal 30 is distorted or forced to curved form in the full three dimensions of the capsule 33, such nematic liquid crystal material in such capsule takes on an improved characteristic of being insensitive to the direction of optical polarization of incident light. The inventor has discovered, moreover, that when the liquid crystal material 32 in the capsule 33 has pleochroic dye dissolved therein, such dye, which ordinarily also would be expected to have optical polarization sensitivity, no longer is polarization sensitive because the dye tends to follow the same kind of curvature orientation or distortion as that of the individual liquid crystal molecules.

Although the foregoing discussion has been in terms of a homogeneous orientation of the liquid crystal material (parallel to the capsule wall), such is not a requisite of the invention. All that is required is that the interaction between the wall and the liquid crystal produce an orientation in the liquid crystal near that wall that is generally uniform and piecewise continuous, so that the spatial orientation of the liquid crystal material over the capsule volume is strongly curved and there is no substantial parallel direction of orientation of the liquid crystal structure in the absence of an electric field. It is this strongly curved orientation that results in the scattering and polarization insensitivity in the field-off condition, which is a feature of this invention.

In the field-on condition, or any other condition which results in the liquid crystal being in ordered or parallel alignment, as is shown in FIG. 4, the encapsulated liquid crystal 30 will transmit substantially all the light incident thereon and will tend not to be visible in the containment medium or support medium. On the other hand, in the field-off condition when the liquid crystal is in distorted alignment, sometimes referred to herein as random alignment, for example as is shown in FIG. 3, some of the incident light will be absorbed, but also some of the incident light will tend to be scattered generally isotropically in the containment support medium 31. Using total internal reflection such isotropically scattered light can be redirected to the encapsulated liquid crystal 30 thus brightening the same tending to cause it to appear white to a viewer or viewing instrument.

As long as the ordinary index of refraction of the liquid crystal material is closer to the index of refraction of the so-called encapsulating or containment medium, than is the extraordinary index of refraction, a change in scattering will result when going from field-on to field-off conditions, and vice-versa. Maximum contrast results when the ordinary index of refraction matches the index of refraction of the medium. The closeness of the index matching will be dependent on the desired degree of contrast and transparency in the device, but the ordinary index of refraction of the crystal and the index of the medium will preferably differ by no more than 0.03, more preferably 0.01, especially 0.001. The tolerated difference will depend upon capsule size.

The capsules 33 may be of various sizes. The smaller the size, though, the higher the requirements will be for the electric field to effect alignment of the liquid crystal in the capsule. Preferably, though, the capsules should be of uniform size parameters so that the optical and electrical characteristics of the encapsulated liquid crystal will be substantially uniform. Moreover, the capsules 33 preferably are at least 1 micron in diameter so they appear as discrete capsules relative to an incident light beam; a smaller diameter may result in the light beam "seeing" the capsules as a continuous homogeneous layer and would not undergo the required isotropic scattering. Examples of capsule sizes, 0.3 to 100 microns or say from 1-30 microns diameter, and of liquid crystal material are in the above concurrently filed application and are hereby specifically incorporated by reference.

One preferred liquid crystal material in accordance with the best mode of the invention is that nematic material NM-8250, an ester that has been sold by American Liquid Xtal Chemical Corp., Kent, Ohio, U.S.A. Other examples may be ester combinations, biphenyl and/or biphenyl combinations, and the like.

Several other types of liquid crystal material useful according to the invention include the following four examples, each being a recipe for the respective liquid crystal materials. The so-called 10% material has about 10% 4-cyano substituted materials; the 20% material has about 20% 4-cyano substituted materials, and so on.

| 10% Material | |
|---|---|
| Pentylphenylmethoxy Benzoate | 54 grams |
| Pentylphenylpentyloxy Benzoate | 36 grams |
| Cyanophenylpentyl Benzoate | 2.6 grams |
| Cyanophenylheptyl Benzoate | 3.9 grams |
| Cyanophenylpentyloxy Benzoate | 1.2 grams |
| Cyanophenylheptyloxy Benzoate | 1.1 grams |
| Cyanophenyloctyloxy Benzoate | 9.94 grams |
| Cyanophenylmethoxy Benzoate | 0.35 grams |
| 20% Material | |
| Pentylphenylmethoxy Benzoate | 48 grams |
| Pentylphenylpentyloxy Benzoate | 32 grams |
| Cyanophenylpentyl Benzoate | 5.17 grams |
| Cyanophenylheptyl Benzoate | 7.75 grams |
| Cyanophenylpentyloxy Benzoate | 2.35 grams |
| Cyanophenylheptyloxy Benzoate | 2.12 grams |
| Cyanophenyloctyloxy Benzoate | 1.88 grams |
| Cyanophenylmethoxy Benzoate | 0.705 grams |
| 40% Material | |
| Pentylphenylmethoxy Benzoate | 36 grams |
| Pentylphenylpentyloxy Benzoate | 24 grams |
| Cyanophenylpentyl Benzoate | 10.35 grams |
| Cyanophenylheptyl Benzoate | 15.52 grams |
| Cyanophenylpentyloxy Benzoate | 4.7 grams |
| Cyanophenylheptyloxy Benzoate | 4.23 grams |
| Cyanophenyloctyloxy Benzoate | 3.76 grams |
| Cyanophenylmethoxy Benzoate | 1.41 grams |
| 40% MOD | |
| Pentylphenylmethoxy Benzoate | 36 grams |
| Pentylphenylpentyloxy Benzoate | 24 grams |
| Cyanophenylpentyl Benzoate | 16 grams |
| Cyanophenylheptyl Benzoate | 24 grams |

The encapsulating or containment medium forming respective capsules 33 should be of a type that is substantially completely unaffected by and does not affect the liquid crystal material. Various resins and/or polymers may be used as the encapsulating medium. A preferred encapsulating medium is polyvinyl alcohol (PVA), which has a good, relatively high, dielectric constant and an index of refraction that is relatively closely matched to that of the preferred liquid crystal material. An example of preferred PVA is an about 84% hydrolized, molecular weight of at least about 1,000, resin. Use of a PVA of Monsanto Company identified as Gelvatol 20/30 represents the best mode of the invention. Other containment media are latex and epoxy. Examples of several containment media include carboxy polymethylene (e.g. Carbopole), various Gelvatol materials, Elvanol, and Poval.

A method for making emulsified or encapsulated liquid crystals 11 may include mixing together the containment or encapsulating medium, the liquid crystal material, and perhaps a carrier medium, such as water. Mixing may occur in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 33 of each thusly made encapsulated liquid crystal 30 may not be a perfect sphere, each capsule will be substantially spherical in configuration because a sphere is the lowest free energy state of the individual droplets, globules or capsules of the emulsion, both when originally formed and after drying and/or curing.

In accordance with the invention, other various types of support media 26 that may be used include Mylar, polyester materials and polycarbonate material, such as Kodel film. Tedlar film, which is very inert, also may be used if adequate adhesion of the electrode can be accomplished. Such media 26 preferably should be substantially optically transparent.

Figure 5:
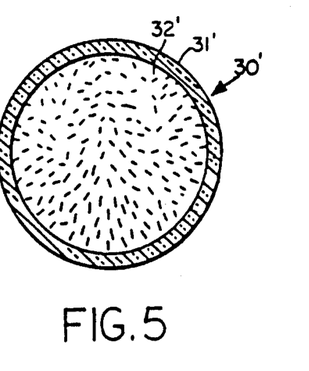
FIG. 5 is a schematic illustration like FIGS. 3 and 4 showing an altenate embodiment of encapsulated liquid crystal.

Briefly referring to FIG. 5, there is shown an alternate embodiment of encapsulated liquid crystal material 30', which may be substituted for the various other embodiments of the invention disclosed herein. The encapsulated liquid crystal material 30' includes operationally nematic liquid crystal material 32' in a containment medium 31', e.g. in the form of a spherical capsule. In FIG. 5 the material 30' is in field-off condition, and in that condition the structure of the liquid crystal molecules is oriented to be normal or substantially normal to the capsule wall at the interface therewith. Thus, at the interface the liquid crystal structure is generally oriented in a radial direction with respect to the geometry of the capsule. Moving closer toward the center of the capsule, the orientation of the structure of at least some of the liquid crystal molecules will tend to curve in order to utilize, i.e. to fill, the volume of the capsule with a substantially minimum free energy arrangement of the liquid crystal in the capsule, for example, as is seen in the drawing.

Such alignment is believed to occur due to the addition of an additive to the liquid crystal material 32' which reacts with the containment medium to form normally oriented steryl or alkyl groups at the inner capsule wall. More particularly, such additive may be a chrome steryl complex or Werner complex that reacts with PVA of the containment medium that forms the capsule wall to form a relatively rigid crust or wall with a steryl group or moeity tending to protrude radially into the liquid crystal material itself. Such protrusion tends to effect the noted radial or normal alignment of the liquid crystal structure. Moreover, such alignment of the liquid crystal material still complies with the above strongly curved distortion of the liquid crystal structure in field-off condition because the directional derivatives taken at right angles to the general molecular direction are non-zero.

The projector 1 of the invention preferably uses light that is transmitted through the liquid crystal material without refraction or that is forward scattered by the liquid crystal material.

Referring to FIGS. 2, 6, 7 and 8, in response to selective application of a charge creating a voltage or electric field at certain areas of the encapsulated liquid crystal layer 25, for example at areas 25A and 25B represented on the surface 4S and the non-application of electric field to other selected areas of the layer 25, for example at areas 25C and 25D represented on the surface 4S, alignment or not of that liquid crystal which is directly between such respective area on surface 4S and the electrode 27, or non-alignment (when no field is applied at a given area) can be achieved. Due to the effective capacitance of the encapsulated liquid crystal layer 25, when a charge is applied to a selected area, say at 25A, 25B, etc., such charge is stored and takes a finite time, for example several seconds or longer, to dissipate; and for the duration of such storage charge, the effect of the electric field produced across the selected encapsulated liquid crystal material generally aligned between such area and the electrode 20 will remain in the desired alignment with respect to such field. Accordingly, by selecting particular areas of the encapsulated liquid crystal layer 25 at which electric field is to be applied, a representation of an image can be formed and stored by the encapsulated liquid crystal layer 25.

To complete the effective formation of an image by the imager 2 in response to such selective application of charge to various areas thereof, illumination is required. According to the preferred embodiment and best mode of the invention the source of illumination is provided by the projection optics 3. Such light source may illuminate the entire encapsulated liquid crystal layer 25 simultaneously for projection, as is described further below.

Effective formation of a viewable image capable of projection, for example, preferably is carried out in accordance with the disclosure in the above mentioned application Ser. No. 477,138. Specifically, using the principle of total internal reflection, and possibly also optical interference, light which is scattered, preferably isotropically scattered, by that encapsulated liquid crystal material in the layer 25 to which an electric field is not applied, e.g. that liquid crystal material which is in the curvilinearly algined or distorted structure condition, will be reflected or redirected back to such encapsulated liquid crystal material. A portion of the light scattered by such liquid crystal material also will scatter in a forward direction, e.g. toward the projection lens 60. On the other hand, light, for example from the light source, which impinges onto that encapsulated liquid crystal material 30 in the layer 25 which is aligned with respect to an electric field will tend not to be scattered and, rather, will tend to pass directly through such liquid crystal material and the layer 25. It will be appreciated that by selecting those areas, e.g. 25A-25D, and so on, where surface charge is or is not to be applied to the surface 4S in order to apply an electric field to selected encapsulated liquid crystal material in the layer 25, alphanumeric, graphical, pictorial, etc., images can be created, and those images can be projected.

The charge applicator 5 includes, for example, an electronics portion 40, a drive motor 41 and a dynamic electrode 42. Responding to the information received from the computer/programmed drive 18 or other input system, the charge applicator 5 decodes such information and based thereon applies surface charge to selected areas of the surface 23 of the encapsulated liquid crystal layer 25. The drive motor 41 operates in response to control signals and/or power from the electronics portion 40 (possibly power may be provided from an external source, not shown). The dynamic electrode 42 is shown as a generally cylindrical scanning roller 43, which is seen in front elevation view in FIG. 6. Scanning here refers to relative movement occurring between the dynamic electrode 42 and the surface 4S to enable various locations on such surface in a sense to be addressed and to receive surface charge. Preferably the roller 43 is of electrically non-conductive material, and the roller has thereon a plurality of electrically conductive electrode strips 44. The electrode strips 44 are formed on or attached to the non-conductive exterior surface 45 of the roller and are electrically isolated from each other. The electrode strips 44 extend in annular fashion preferably completely circumferentially about the roller 43. The electrode strips 44 respectively are positioned in planes that are perpendicular to the axis 46 of the roller 43 so that as the roller rolls along the surface 4S preferably in a direction perpendicular to the roller axis and without slippage on the encapsulated liquid crystal layer 5, each rotating electrode strip 44 follows a straight line path along such surface 4S.

Figures 6, 7:
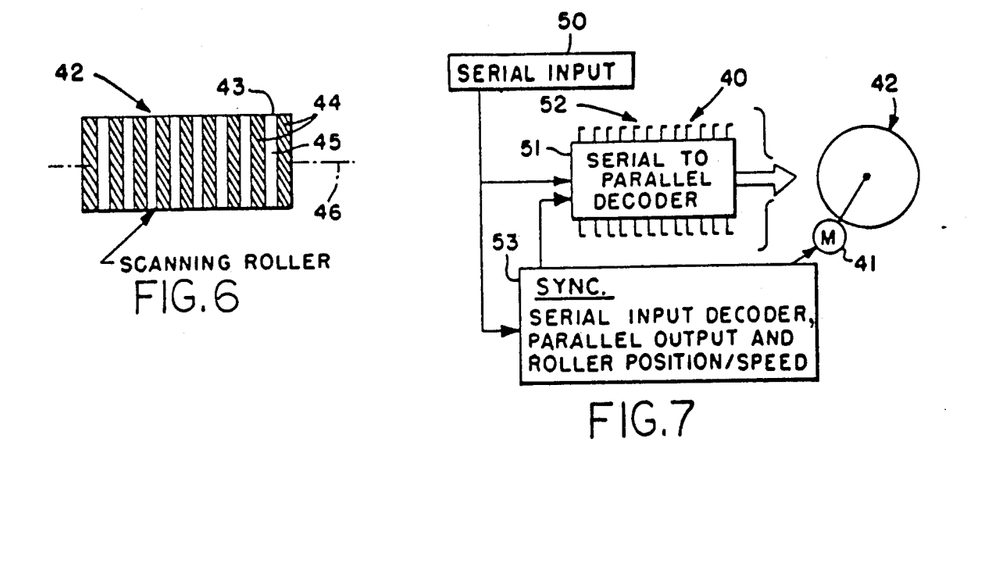
FIG. 6 is a plan view of the rolling dynamic electrode of the imager of FIG. 2.
FIG. 7 is a schematic block diagram of the electronics portion of the imager of FIG. 2.

The roller 43 may be mounted so the axis thereof does not in fact move. Rather, the surfaces of the electrode strips roll along the surface 4S as the latter is moved along its own continuous path by the motor 13 and drive roller 12. If desired the motors 13, 41 may be a single motor with appropriate drive connections to the roller 12 and electrode 42.

The electronics portion 40 cooperates with, monitors, and controls the motor 41, the position of the dynamic electrode 42 along the surface 4S, and the voltage applied (or not applied) to respective electrode strips 44. The electronics portion 40 also is connected to the electrode 27, which preferably is over the entire lower surface 4L of the encapsulated liquid crystal layer 25, e.g. using roller 17, and the potential of such electrode 27 is maintained, for example, at a relative ground potential so that voltage applied to an area of the surface 4S by an electrode strip 44 would be with respect to such ground or other reference potential. Appropriate wipers, brushes or other means may be used to connect the electrode 27 to the electronics 40 and/or to the roller 15, 17.

In the electronics portion 40 the information from the input system 18, for example in the form of a serial input represented at 50, is converted to parallel information by a conventional serial to parallel decoder 51. The serial to parallel decoder 51 may be a conventional serial to parallel decoder, such as an integrated circuit device, for example a UART (universal asynchronous receive transmit device), or a plurality of the same, which produce parallel information on the parallel output lines 52 directly representative of the serial input information. Such parallel output lines 52 are respectively connected to the individual electrode strips 44 to apply any voltage on the respective output line to a respective electrode strip. If necessary various conventional logic circuitry may be used to decode the input data from the input system 18 to derive the parallel output data as the roller 43 rolls along the surface 4S. Accordingly, the respective electrode strips 44 apply such voltage(s) to the particular area(s) of the encapsulated liquid crystal layer 25 surface 4S with which such electrode strips 44 at that moment are engaged. Moreover, as the dynamic electrode 42 rolls along the surface 4S, such rolling movement is monitored and controlled by a synchronizing portion 53 of the electronics portion 50 e.g. relative to movement of the strip 4.

The synchronizing portion 53 in response to information from the serial input 50 synchronizes rolling movement of the dynamic electrode 42 and the signals produced on the serial to parallel decoder 51. In operation of the charge applicator 5, then, information, for example in the form of serial data, is received from the input system 18. That data is converted by the decoder 51 to parallel data supplied on the output lines 52 to respective electrode strip 44 when the dynamic elctrode 42 is at a particular location on the surface 4S of the encapsulated liquid crystal layer 25; the foregoing is controlled according to the synchronization circuit 53 which operates the motor 41 that moves the dynamic electrode 42 and also preferably monitoring position of the dynamic electrode 42 relative to the strip 4. The synchronization circuit 53 continues to allow the motor 41 to move the dynamic electrode 42 along the surface 4S as additional information is received from the input system and the circuit 53 also continues to allow the decoder 51 to decode the new information and to provide appropriate alterations in the signals on the output line 52 which if necessary appropriately alter the voltage applied to respective electrode strips 44 depending on the nature of the input information. As the dynamic electrode 42 rolls along the surface 4S, then, the electrode strips 44 apply surface charge to selected areas, such as areas 25A, 25B. Such surface charge results in the application of an electric field between the respective area and the electrode 27 at the opposite surface 4L of the encapsulated liquid crystal layer 25 causing parallel alignment of the encapsulated liquid crystal material 30 therebetween. As was mentioned above, the encapsulated liquid crystal layer 25 has dielectric and resistive characteristics so as to be capable of storing such surface charges at the respective areas for a period of time that is adequate for the projection optics 3 to project the image effectively created in the encapsulated liquid crystal layer 25.

Figure 8:
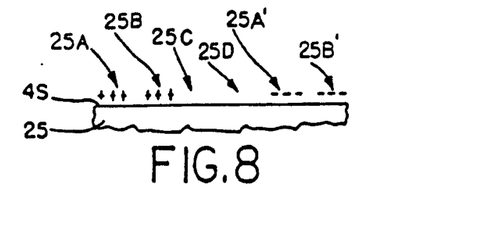
FIG. 8 is a fragmentary side elevation view of the sheet-like strip of liquid crystal material of FIG. 2 with respective surface charges applied to the surface thereof.

As is shown in FIG. 8, different surface charges can be applied to different surface areas of the surface 4S. For example, at areas 25A and 25B a positive charge has been deposited, and at areas 25C and 25D there is no charge. The deposited charge may be positive or negative. For example, at areas 25A′ and 25B′ negative charge is shown. Also, if desired, to expedite discharging an area of a given polarity, a charge of opposite polarity or a ground discharging connection made via the respective electrode strip passing over the respective area may be employed.

THE PROJECTOR APPARATUS

Figure 9:
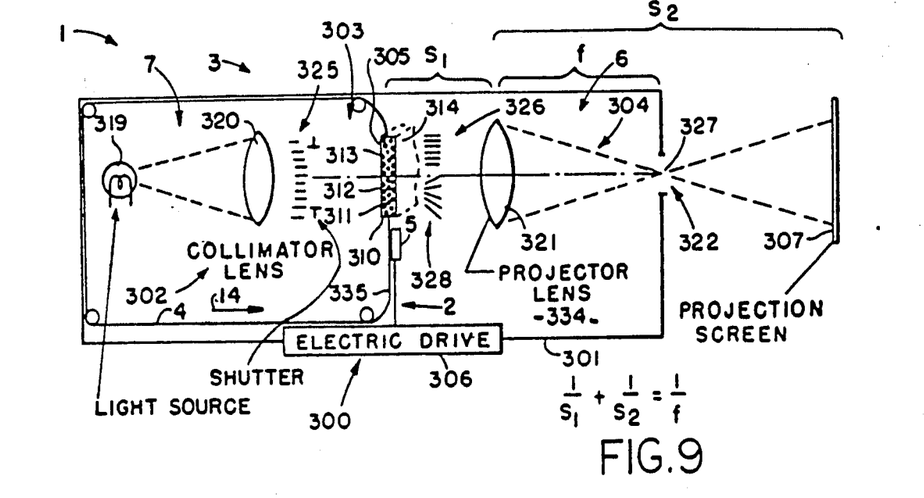
FIG. 9 is a schematic illustration of a liquid crystal projector in accordance with the present invention.

Turning, now, to FIG. 9, a liquid crystal projector according to the invention is designated 300. The projector 300 inlcudes a housing 301 (analogous to housing 9. FIG. 1), an optics portion 302, including light input and light output portions 303, 304 (respectively analogous to the light souce, preliminary, e.g. a condensing or collimating lens, and shutter 7 of FIG. 1), and a liquid crystal display 305 (analogous to the imager 2), all preferably located within, coupled to, or supported with respect to the housing 301, and an electric drive 306 (analogous to drive 18), which may be within, on, or external of the housing 301. The purpose of the projector 300 is to project an image or characteristics of an image formed by the liquid crystal display 305, while the same is driven by the electric drive 306, onto a projection screen or the like 307 (analogous to screen 8).

The liquid crystal display 305, which represents the part of the strip 4 immediately aligned in the projection optics 3 for projection of an image therein, is intended selectively to affect (e.g. scatter) and not to affect (e.g. transmit) light incident thereon. For example, the liquid crystal display 305 would include a support medium and/or containment medium 310 having one or more layers of plural volumes of liquid crystal material 311 therein. The support/containment medium 310 preferably is formed as a strip of material having a dimension extending into the plane of the drawing of FIG. 9 with an edge 312 of such strip being seen in FIG. 9. The opposite surfaces 313, 314 of the display sheet preferably are optically transparent as opposed to being absorbent or reflective. Therefore, when an electric field is applied to a selected portion or area of liquid crystal contained in the display 305, whereby such liquid crystal material becomes effectively transparent, light incident on the display 305 will be transmitted therethrough without substantial scattering or absorption. However, light incident on those portions of the display 305 in which the volumes of liquid crystal material 311 are in the scattering mode described above, or in any event in the field-off, curvilinearly aligned or distorted structural orientation, will tend to be isotropically scattered, for example over 2 pi radians, as viewed in the planar drawing, or 4 pi steradians in three dimensions (spherical volumes), by such liquid crystal material in the manner described in greater detail above.

Dye, such as non-pleochroic dye, may be included in display 305 to color light to produce a colored output. Pleochroic dye may be included in the liquid crystal.

In optics 302 of projector 300, light input portion 303 includes light source 319, e.g. a conventional electric lamp or projector lamp, and collecting or collimating lens 320, and light output portion 304 includes projection lens 321 and light control device or light controller 322 to discriminate between light scattered by and transmitted through liquid crystal display 305. In one embodiment light control device 322a (FIG. 10) primarily is a mask 323, and in a second embodiment light control device 322b (FIG. 14) is an aperture 324. In either case, light control device 322 selects scattered or transmitted light for projection. Operation of several projector embodiments disclosed herein generally follows the lens formula $$(1/S_1)+(1/S_2)=(1/f).$$

Although such formula applies to thin lenses, it will be apparent to those having ordinary skill in the art that similar properties and operational constraints will apply to thick lenses and to multiple lens systems, which are contemplated as included in the invention.

Light source 319 is located at a focal point of the collimating lens 320 so that such lens produces a collimated light output 325 directed at liquid crystal display 305. Collimated light 325 incident on portions of liquid crystal display 305 in field-on, optically transmissive condition, will be transmitted through display 305 and will continue as transmitted collimated light 326 to projection lens 321. The projection lens focuses such transmitted collimated light 326 at a focal point 327.

Collimated light 325 incident on liquid crystal material 311 in the field-off, curvilinearly aligned, distorted, etc., in any event generally isotropic scattering mode or structural alignment, will tend to be scattered. Such scattered light is represented at 328 in FIG. 9. Such scattered light 328 may or may not be received by lens 321. If received, such scattered light will tend to be projected by lens 321 toward light control device 322 but in general will not be focused at the focal point 327. Scattering of light by liquid crystal display 305 occurs primarily due to the difference between the index of refraction of support/containment medium 310 and the extraordinary index of refraction of the liquid crystal material itself. (Optical transmission through display 305 without scattering is maximized when the ordinary index of refraction of the liquid crystal material and the index of refraction of the containment/support medium are matched as closely as possible—most preferably are equal.)

Although the volumes of liquid crystal material 311 may be arranged in one or more substantially continuous layers throughout liquid crystal display 305, such volumes of liquid crystal material also may be patterned, whereby discrete sections of liquid crystal display 305 would contain such volumes and other sections would not, thereby providing isolation for respective liquid crystal sections. Electric drive 306 may be a computer with appropriate power output and/or control circuitry of conventional design capable of causing the charge applicator 5 to apply charge selectively, as was described above, to produce an electric field across the liquid crystal material 311.

Figure 10:
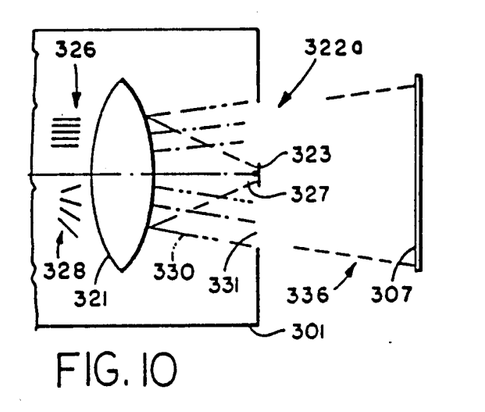
FIGS. 10 and 11 are fragmentary schematic illustrations of alternate light output mechanisms used in connection with the projection lens in the projector of FIG. 9.
Figure 11:
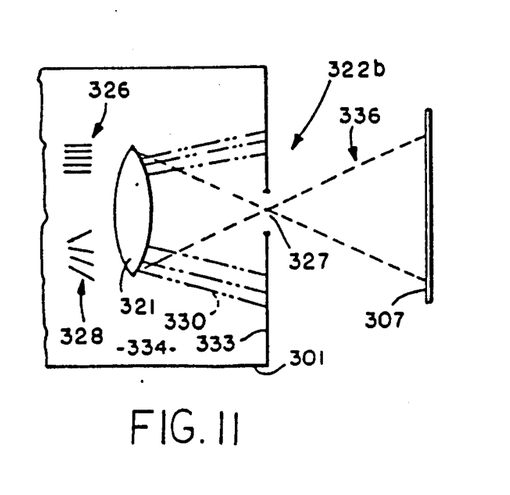

Turning, now, particularly to FIG. 10, the light control device 322a includes a mask 323 located at the focal point 327 of the projection lens 321. The collimated light 326 received by the lens 321 is focused at the focal point 327 and simply is blocked by the mask 323. However, the lens 321 projects the scattered light 328 as light 330 out through a light output opening 331 in the projector 300 housing 301 to form the desired viewable image on the projection screen 307. To maximize the amount of scattered light collected, the lens 321 in this embodiment should be as large as is reasonably possible. Additional lenses, mirrors, filters, etc., as may be desired or required, may be employed to complete the function of projecting the light 330 passing out through the opening 331 to form the desired image on the screen 307. Using the projector 300 with the light control device 322a, then, those portions of the liquid crystal display 305 which are transmissive will appear black or dark on the screen 307 and those portions which are in scattering mode will appear relatively bright on the screen 307.

In FIG. 11, now, the light control device 322b includes an aperture 324. The projection lens 321 focuses the collimated light 326 at focal point 327, which is located in the aperture or at least in a position with respect to the aperture 324 so as to permit the passage of all or substantially all of the light focused thereat through the opening 332 for projection onto the screen 307. One or more additional lenses, mirrors or other optical devices may be employed to complete the function of projecting such light passing through the aperture 324 onto the screen 307. However, the scattered light 328 reaching the lens 321 is directed as light 330 onto walls 333 of the projector 300 housing 301 and/or walls bounding the aperture and, in any event, is blocked from being transmitted through the aperture opening 332. Preferably the mask 323 (FIG. 10) and the walls 333 are optically absorbent, for example including black paint, black felt, or other material to absorb light incident thereon, therefore preventing the reflection of spurious light back into the interior 334 of the projector housing. In fact, all of the interior walls of the projector housing 301 may be black or otherwise light absorbent to minimize spurious light therein.

In operation of the projector 300 employing the light control device 322b, then, those portions of the liquid crystal display 305, which are in the field-on, light transmitting mode, will appear bright on the screen 307; whereas those portions of the liquid crystal display 305 which are in the scattering mode will appear relatively dark on the screen 307. As was mentioned above, the lens formula $$(1/S_1)+(1/S_2)=(1/f)$$

generally applies. $S_1$ is the object distance, i.e. the distance of the display 305 from the lens 321; $S_2$ is the image distance, i.e. the distance of the screen 307 from the lens; and f is the focal length of the lens.

Various conventional support means (not shown) may be employed in the projector 300 as well as in the other projectors described below with respect to FIGS. 12A and 13, to support the various components of the projector in the housing 301 or in any event with respect to such housing or with respect to each other. Examples would be a socket for the lamp of the light source 319, lens holders for the lenses 320, 321, a support frame, such as a holder, or transparent substrate, such as a sheet of glass, plastic, Mylar film, etc. for the liquid crystal display 305, and so on. Appropriate electrical connections (not shown) also would be apparent to those having ordinary skill in the art, such as, for example, power connections to the light source 319 and electrical connections, represented at 335, between the electric drive 306 and the several electrodes of the liquid crystal display 305. Moreover, adjustability of the light output 336 from the projector 300 may be effected by appropriate adjustability of the size of the mask 323, of the opening 331, and/or of the opening 332 in the aperture 324.

Advantages of the projector embodiment of FIG. 10 in particular are the ability to use a display 305 that produces a relatively small amount of scattering in field off condition—therefore the display can be relatively thin; and the ability accurately to control with facility the so-called turn on characteristics of the display and projector using same.

Figure 12A:
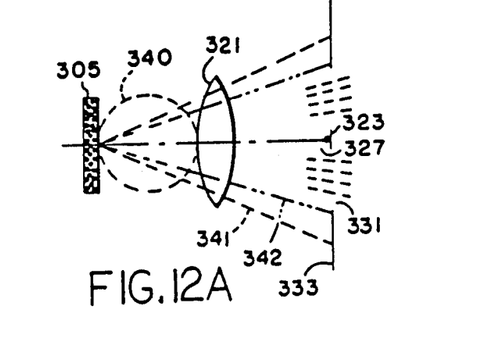
FIGS. 12A and 12B are, respectively, a schematic representation of light scattered by the liquid crystal display of FIG. 10 and a graph of intensity of projected light as a function of electrical input magnitude.
Figure 12B:
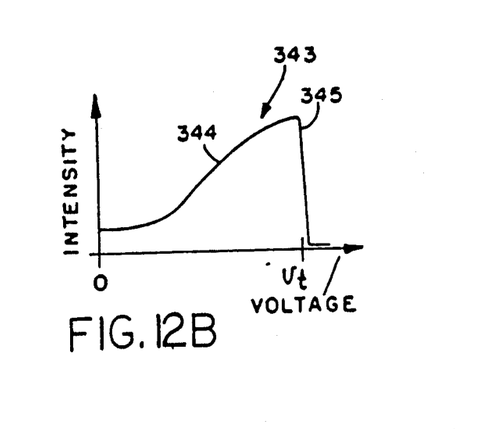

The illustrations in FIGS. 12A and 12B demonstrate such advantages of the projector 301 of FIG. 10. In FIG. 12A is a profile 340 showing how much light may be scattered in respective directions on one side of the display 305 when in field off condition. Much of the scattered light is transmitted through lens 321 and opening 331, but some scattered light is scattered away from the opening 331 and is blocked by the housing wall 333. As electric field is applied to the liquid crystal display 305, the cone of light 341 on the profile 340 will tend to collapse, e.g. as is shown at 341, and the amount of scattered light, i.e. intensity, exiting the opening 331 will increase. The general increase in intensity of projected light through opening 331 as a function of voltage or electric field magnitude is represented by curve 343 in FIG. 12B, particularly at the lefthand portion 344 of the curve. The change in intensity at curve portion 344 is relatively gradual, and in any event over the extent thereof light will be transmitted through the opening 331.

However, when adequate voltage $V_t$ is applied to liquid crystal in the display a very rapid transition occurs in the liquid crystal alignment, i.e. so as to become substantially transparent, whereupon the transmitted light therefrom is focused on the mask 323 and does not pass through opening 331. Such rapid transition is represented in FIG. 12B at curve portion 345 which has a much steeper slope than does curve portion 344.

Figures 13, 14:
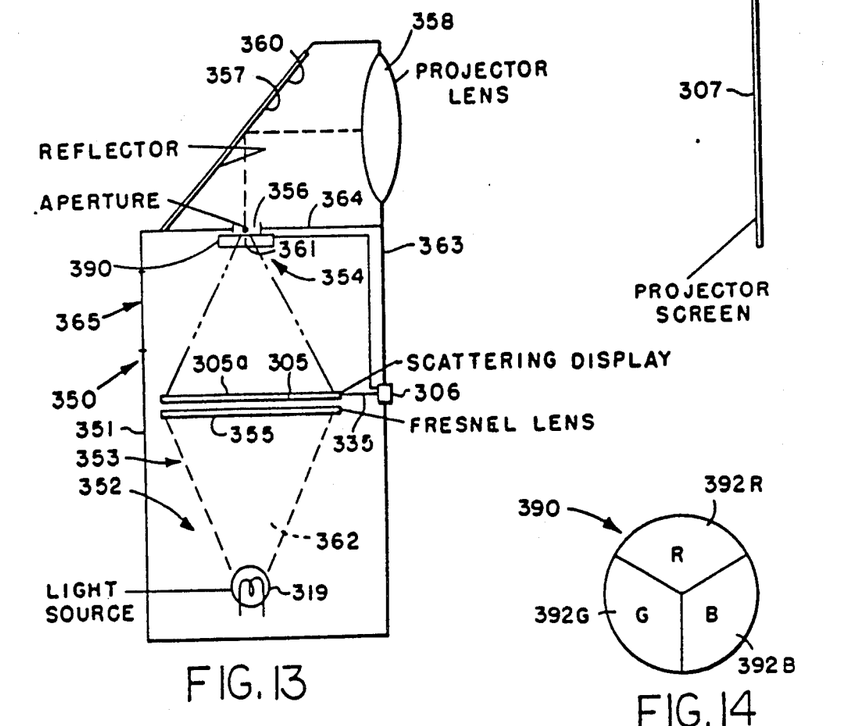
FIG. 13 is a schematic illustration of a folded liquid crystal projector in accordance with the preferred embodiment and best mode of the invention with a dynamic color filter.
FIG. 14 is a plan view of the dynamic color filter.

Referring to FIG. 13, the preferred embodiment and best mode of the invention in the form of a liquid crystal projector 350 is shown. The projector 350 includes a modified housing 351 containing the projector optics 352, including a light input portion 353 and a light output portion 354. The light input portion 353 includes a light source 319 and a Fresnel lens 355, and the light output portion 354 includes an aperture 356, a reflector 357, and a projection lens 358. The reflector 357 and projection lens 358 are positioned in a housing or frame portion 360 optically downstream of the aperture 356, which is mounted in the housing 351. The reflector 357 is provided to fold the optical path of the liquid crystal projector 350 and thereby to reduce the size and/or general structural configuration of the projector relative to, for example, the straight through projector 300 shown in FIG. 9.

The light source 319 is located at one principal point or focus of the Fresnel lens 355, and the aperture 356 is located at the opposite principal point or focus 361 of the Fresnel lens 355. Therefore, in the absence of any optical disturbance, light from the source 319 traveling along the optical path 362 and received by the Fresnel lens 355 will be focused at the focal point 361 in the aperture or proximate the aperture 356. Moreover, the light transmitted through the aperture 356 will be reflected by the reflector 357 toward the projection lens 358 and will be projected by the latter onto the screen 307, for example to form an image thereon.

The display 305, i.e. that part of strip 4 then being in line to be projected, e.g. a given frame area of the strip 4, is mounted preferably in parallel and in proximity to the Fresnel lens 355 and also is mounted in the object plane of the lens 321, i.e. a distance $S_1$ from the lens according to the above formula requirements. Preferably the effect of the index of refraction of the display 305 will not detrimentally affect the light focused by the Fresnel lens 355 at the aperture 356 unless liquid crystal in the display is in the scattering mode.

In operation of the liquid crystal projector 350, then, the electric drive 306 operating through the interconnection 335 to the liquid crystal display 305 applies an electric field, for example, to selected portions of the display and does not apply an electric field to other portions. Those portions in which the field is applied will be optically transmissive, and the other portions will operate in a scattering mode, as aforesaid. The light transmitted through the display 305 will be focused at the focal point 361 of the Fresnel lens 355 in the aperture 356. Such light, moreover, will be reflected by the reflector 357 and projected by the lens 358 onto the screen 307 to form bright areas of an image thereon. On the other hand, those portions of the liquid crystal display 305 which tend to scatter light, will scatter such light generally isotropically preferably over 4 pi steradians and, in any event, substantially most of such light will be scattered away from or so as not to pass through the aperture 356 and instead will be absorbed by the walls or material associated with, lining, etc. the housing 351.

The preferred projector 350 of the invention preferably has color capability. Thus, there is located at the aperture 356 a color filter type device 390, which may be operatively controlled by the electric drive 306 connected by connection 335a to color or not light transmitted through the liquid crystal display 305 and focused by the Fresnel lens 355 onto the aperture 356.

The color filter type device 390 is shown in plan view in FIG. 14 having respective red, green and blue pie-shape sectors 392R, 392G, 392B. Each sector preferably is comprised of liquid crystal display material the same as or similar to that used for the liquid crystal display 355; however, each individual sector of the filter 390 is dyed a respective color. More specifically, the filter 390 may be formed of operationally nematic liquid crystal material contained in plural volumes formed in a containment medium. Non-pleochroic dye preferably is provided, for example by imbibition or otherwise, in the liquid crystal material and/or containment medium in the respective colored sectors. Electrodes positioned on opposite sides of the filter 390 may be energized selectively by the electric drive 306 to apply an electric potential across any one or more of the sectors causing the same to become generally optically transparent, but nevertheless capable of tinting or coloring light transmitted therethrough. In operation, then, if the red sector 392R had an electric field applied across it to make the same relatively transparent, while the green and blue sectors 392G, 392B were not energized, light transmitted through the aperture 356 and projected by the lens 358 would be tinted or colored red. Similar operation could occur by exclusively energizing one of the green or blue sectors 392G, 392B to effect green or blue coloring of the projected light. Additive coloring could occur, too, by energizing two or three of the sectors in the filter 390. As to those segments 392 which are not energized and optically transmissive, the same will tend to scatter light which primarily will not be collected by the lens 358 for projection onto the screen 307; although some of such scattered light may be collected and transmitted, nevertheless the amount of that light would be relatively small compared to that transmitted through the energized sector and, accordingly, would have minimal effect on the color projected onto the screen 307. Also, if desired, an additional undyed sector may be included in the filter 390 to facilitate transmitting white light to the lens 358 for projection onto the screen 307. It will be appreciated that the electric drive 306 may change selectively the portions or pixels of the liquid crystal display 305 and can coordinate the same with selected operation of the filter 390 thereby to produce single color or multicolored images, either still or moving, for projection by the lens 358 onto the screen 307.

It will be appreciated that the projector 350 provides control of the optical characteristics of an image projected onto a relatively large screen by using a relatively small size light control shutter which preferably has one or more different color sectors or segments. Thus, a relatively large area of output light, i.e. the image projected onto the screen 307, can be chopped or controlled by a relatively small area shutter 390, and using only three different colored sector portions 392 of the filter 390, more than three color outputs can be obtained.

Figure 15:
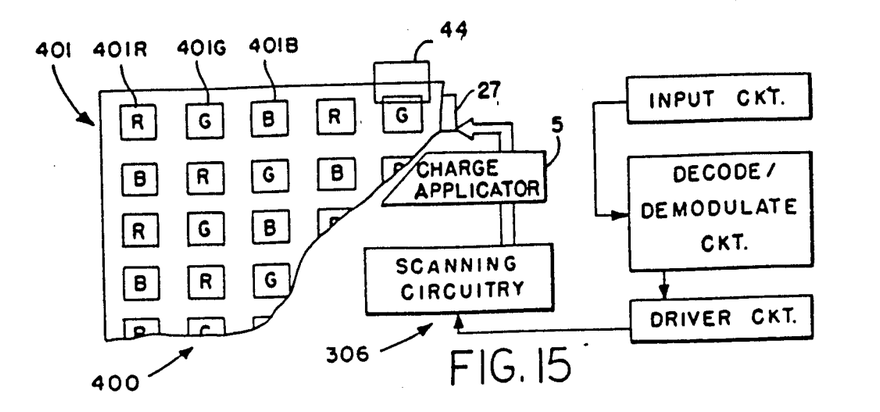
FIG. 15 is a dye display for use in the projectors.

Briefly referring to FIG. 15, a liquid crystal display 400 for use with the several projectors of the invention is shown in conjunction with an electric drive 306. The display 400 has dye 401 therein. Such dye is represented schematically. However, it will be appreciated that such dye 401 may be pleochroic dye in the liquid crystal to reduce transmission and scattering in the field-off condition; may be a non-pleochroic one color dye in the liquid crystal or in the contact/support medium to color light; or may be several non-pleochroic dyes of several different colors located in different portions of the display to provide a multicolor output tending to effect a tinting or coloring form of light projected by the projector using such display 400.

Using the circuitry illustrated in FIG. 15 in cooperation with the charge applicator 5, for example, then, various pixel-like areas, such as those identified 401R, 401G, 401B in the display 400 selectively can be addressed to apply or not to apply charge and, thus, an electric field thereacross. Depending on which pixels are energized and which are not, light transmitted through the display 400 may be colored so that the resulting output of light projected by a projector using such display 400 will provide a color output. Moreover, if the pixels in the display 400 are adequately small, the same may in effect be additive in the coloring effect on the projected light. Accordingly, various colors may be produced by having more than one of such pixels energized or not at any given time. Such additive coloring may be considered analogous to that which occurs in a conventional color television in which selected color dots or pixels are selectively energized, and ordinarily only three different colors are required to produce virtually any color output, as is known in this color optics field.

Figure 16:
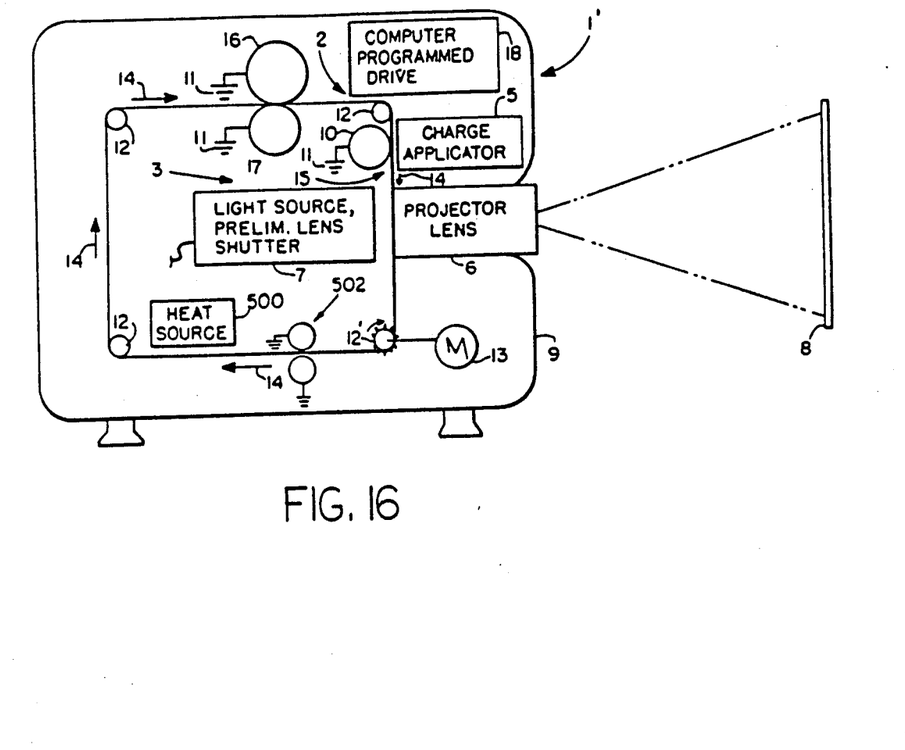
FIG. 16 is a projector for use with smectic liquid crystal.

Reference is made to FIG. 16 in which a modified projector 1' is illustrated. Such projector 1' is substantially the same in construction and operation as the projector 1, except the projector 1' is particularly useful when employing smectic liquid crystal material substituted for the nematic liquid crystal 32 in the volume 33 within containment medium 31. Ordinarily the smectic liquid crystal structure will align with respect to electric field resulting from deposited charge on surface 4S by the charge applicator 5 to achieve transmission of light without scattering at those areas of the smectic liquid crystal strip (strip 4 with smectic material) where such charge exists. However, erasing of a given image by discharging the strip ordinarily would be relatively ineffective because smectic liquid crystal ordinarily is not reversible. Therefore, a heat source 500 is provided relatively downstream of the projection optics to effect such erasing of image characteristics on the strip. If necessary, a further discharge roller or rollers 502 may be used to discharge the strip before such heating of the same.

Such heat source 500 adequately heats the smectic liquid crystal above the smectic nematic transition temperature. As a result, the liquid crystal in the volumes 33 again will have a distorted structure that will, as in the above described projector 1 with the nematic liquid crystal, scatter light and will be already to align with respect to electric field if a charge is applied again, e.g. by the charge applicator. Thus, it will be appreciated that several projector embodiments described above may employ smectic liquid crystal.

STATEMENT OF INDUSTRIAL APPLICATION

The invention may be used, inter alia, to project a light image of characteristics created in a liquid crystal optical display.

I claim:

1. A liquid crystal moving picture projector comprising
   liquid crystal imager means for creating characteristics of an image, and
   projection optics means for projecting images sequentially created by the imager
   said imager means including a continuous strip of liquid crystal material capable of temporarily sorting charge to create characteristics of an image capable of being projected by said projection optics means.

2. The projector of claim 1, said imager means including surface means for storing charge thereon to create an electric field that tends to align liquid crystal material therein.

3. The projector of claim 2, said imager means including electrode means for providing a source of reference potential relative to such charge to effect the application of electric field.

4. The projector of claim 2, said imager means comprising operationally nematic liquid crystal material in a containment medium that tends to distort the natural structure of the liquid crystal in the absence of an electric field to cause scattering or absorption of incident light, and said liquid crystal structure being responsive to application of an electric field to align with respect thereto to reduce such scattering or absorption.

5. The projector of claim 2, said imager means comprising smectic liquid crystal material in a containment medium that tends to distort the natural structure of the liquid crystal in the absence of an electric field to cause scattering or absorption of incident light, and said liquid crystal structure being responsive to application of an electric field to align with respect thereto to reduce such scattering or absorption.

6. The projector of claim 1, said imager means being operative to create characteristics of an image on a frame-by frame-basis for projection.

7. The projector of claim 1, said imager means including a dynamic electrode means for selectively applying charge to the liquid crystal material to create the sequential images.

8. The projector of claim 1, said projection optics means including light source, mask, shutter and lens means for projecting the sequential images created by the imager means.

9. The projector of claim 1, said imager means comprising a continuous strip of liquid crystal material capable of temporarily storing charge to create characteristics of an image on a frame-by-frame basis that can be projected and charge applicator means selectively operable to apply charge to the liquid crystal material to create the sequential images.

10. The projector of claim 9, said projection optics means comprising a projection lens and further optics for projecting the sequential images created by the imager means onto a screen.

11. The projector of claim 10, said further optics comprising light source means for illuminating said liquid crystal imager means, a mask, a shutter and lens system means for projecting an image created by said imager means in response to illumination by said light source means.

12. The projector of claim 11, further comprising housing means for containing said imager means and said projection optics means.

13. The projector of claim 9, said imager means comprising a continuous strip formed of liquid crystal material that has a capacitance characteristic which enables charge to be stored on the surface thereof.

14. The projector of claim 13, said charge applicator comprising means for applying such charge preferably prior to the projection optics means to minimize dissipation between the time the charge is applied and the time the image is projected.

15. The projector of claim 9, said charge applicator means comprising roller means for rolling against the strip means to deposit charge selectively thereon.

16. The projector of claim 9, said charge applicator means comprising electrode means for depositing charge on said strip means, said strip means and said electrode means being relatively movable.

17. The projector of claim 9, further comprising roller means for guiding the strip along a path placing sequential portions thereof sequentially in said projection optics means for projecting images.

18. The projector of claim 17, further comprising motor means to drive one of the roller means in turn to drive the strip means along its path.

19. The projector of claim 18, said charge applicator means being positioned at a charge applying station relatively upstream of the projection optics means.

20. The projector of claim 19, further comprising discharging means for discharging charge from said strip means.

21. The projector of claim 9, said charge applicator means comprising a dynamic electrode.

22. The projector of claim 21, further comprising drive means for controlling the charge applicator means to determine at what areas of the strip means charge is to be applied at what areas charge is not to be applied.

23. The projector of claim 5, further comprising heater means for applying heat to said liquid crystal material to heat the same above the nematic-smectic transition temperature to erase image characteristics from said strip.

24. The projector of claim 23, further comprising discharge means for discharging charge from said strip.

25. A method of projecting plural images in sequence, comprising:
creating an image or characteristics of an image in a liquid crystal material
storing such image by storing charge on a surface of such liquid crystal material,
directing light at such liquid crystal material,
projecting such image as a function of light transmitted through or scattered by such liquid crystal material, and
creating a further image on such liquid crystal material for subsequent projection.

26. The method of claim 25, further comprising erasing the image from such liquid crystal material prior to creating a further image.

27. The method of claim 26, said erasing comprising discharging charge from at least a portion of said strip prior to formation of an image thereat.

28. The method of claim 26, such liquid crystal material comprising smectic liquid crystal material, and said erasing comrising heating such liquid crystal material above the nematic smectic transition temperature.

29. The method of claim 28, said erasing comprising discharging charge from at least a portion of said strip prior to formation of an image thereat.

* * * * *